US011618650B2

(12) United States Patent
Schaeuble, Jr. et al.

(10) Patent No.: US 11,618,650 B2
(45) Date of Patent: Apr. 4, 2023

(54) ELEVATOR BRAKING DEVICE, POWERHEAD AND METHODS

(71) Applicants: Donald Orville Schaeuble, Jr., Potter, WI (US); Alan Thomas Janus, Green Bay, WI (US); Justin Robert Schermetzler, Appleton, WI (US)

(72) Inventors: Donald Orville Schaeuble, Jr., Potter, WI (US); Alan Thomas Janus, Green Bay, WI (US); Justin Robert Schermetzler, Appleton, WI (US)

(73) Assignee: Fox Valley Elevator, LLC, Appleton, WI (US)

( * ) Notice: Subject to any disclaimer, the term of this patent is extended or adjusted under 35 U.S.C. 154(b) by 849 days.

(21) Appl. No.: 16/438,149

(22) Filed: Jun. 11, 2019

(65) Prior Publication Data
US 2019/0382240 A1 Dec. 19, 2019

Related U.S. Application Data

(60) Provisional application No. 62/701,318, filed on Jul. 20, 2018, provisional application No. 62/685,759, filed on Jun. 15, 2018.

(51) Int. Cl.
*B60T 13/04* (2006.01)
*B66B 5/02* (2006.01)
(Continued)

(52) U.S. Cl.
CPC ............... *B66B 5/02* (2013.01); *B66B 1/28* (2013.01); *B66B 5/06* (2013.01); *B66B 11/06* (2013.01);
(Continued)

(58) Field of Classification Search
CPC .. B66B 1/28; B66B 5/06; B66B 11/06; B66B 5/02; F16D 59/02; F16D 2121/26; F16D 2121/005; F16D 55/2255; F16D 65/183
See application file for complete search history.

(56) References Cited

U.S. PATENT DOCUMENTS 3,590,355 A * 6/1971 Davis ..................... B66B 1/16
187/394
5,101,939 A * 4/1992 Sheridan .................. B66D 5/30
188/59
(Continued)

OTHER PUBLICATIONS

David Stockwell et al., "High Security, Robust Locking Applications, Ball-Detent Locking Solenoids: Part Two", Magnet-Schultz of America internet article, https://magnet-schultzamerica.com/resources/blog/part-two-high-security-robust-locking-applications-ball-detent-locking-solenoids-patent-applicaton-no-14592511/, known prior to Jun. 11, 2019, 13 pages.
David Stockwell et al., "High Security, Robust Locking Applications, Ball-Detent Locking Solenoids: Part One", Magnet-Schultz of America internet article, https://magnet-schultzamerica.com/resources/blog/part-one-high-security-robust-locking-applications-ball-detent-locking-solenoids-patent-application-no-14592511/. known prior to Jun. 11, 2019, 6 pages.
(Continued)

*Primary Examiner* — Nicholas J Lane
(74) *Attorney, Agent, or Firm* — Reinhart Boerner Van Deuren P.C.

(57) ABSTRACT

An overspeed brake system for use in an elevator powerhead is provided. A brake rotor is attachable to a cable drum to rotate with a cable drum. A brake member selectively engages the brake rotor upon transition of an actuation lever from a first position to a second position. A biasing member acts on the actuation lever to bias the actuation lever from the first position towards the second position. A latch arrangement has a first orientation maintaining the actuation lever in the first position and a second orientation releasing the actuation lever for transitioning from the first position to the second position. The latch arrangement transitions from the first orientation to the second orientation when a speed
(Continued)

sensing arrangement senses that the rotational speed of the cable drum is at least a predetermined rotational speed.

21 Claims, 8 Drawing Sheets

(51) Int. Cl.
*B66B 11/06* (2006.01)
*B66B 5/06* (2006.01)
*F16D 65/18* (2006.01)
*B66B 1/28* (2006.01)
*F16D 55/2255* (2006.01)
*F16D 125/28* (2012.01)
*F16D 121/16* (2012.01)

(52) U.S. Cl.
CPC ....... *F16D 55/2255* (2013.01); *F16D 65/183* (2013.01); *F16D 2121/16* (2013.01); *F16D 2125/28* (2013.01)

(56) References Cited

U.S. PATENT DOCUMENTS

| 9,455,076 | B2 | 9/2016 | Cascolan | |
| 2008/0202859 | A1* | 8/2008 | Tegtmeier | B66B 5/021 |
| | | | | 187/288 |
| 2012/0153754 | A1* | 6/2012 | Vincent | B66D 5/14 |
| | | | | 310/77 |

OTHER PUBLICATIONS

"Simplified Locking Through Ball-Detent Solenoids", Magnet-Schultz of America internet article, https://magnet-schultzamerica.com/resources/blog/ball-detent-solenoids-locking-devices-simplified/, known prior to Jun. 11, 2019, 10 pages.

Magnet-Schultz of America internet webpage, https://magnet-schultzamerica.com/blog/category/ball-detent-locking-solenoid-assemblies/, known prior to Jun. 11, 2019, 4 pages.

* cited by examiner

ELEVATOR BRAKING DEVICE, POWERHEAD AND METHODS

CROSS-REFERENCE TO RELATED PATENT APPLICATIONS

This patent application claims the benefit of U.S. Provisional Patent Application No. 62/685,759, filed Jun. 15, 2018, and U.S. Provisional Patent Application No. 62/701,318, filed Jul. 20, 2018, the entire teachings and disclosure of which are incorporated herein by reference thereto.

FIELD OF THE INVENTION

This invention generally relates to elevators and particularly powerheads for elevators and brake systems for power heads for elevators.

BACKGROUND OF THE INVENTION

Elevators are used to transport objects and people from vertical location to another vertical location. Unfortunately, if a failure occurs in the powerhead of the elevator, the elevator car of the elevator may free fall and result in damage to the objects or injury to people.

Residential elevators typically only have to travel a few stories of a building and thus have limited time to actually stop or slow motion of the elevator car upon a failure in the powerhead. The present invention provides an improvement over the current state of the art in elevators and particularly residential or other minimal travel elevators.

BRIEF SUMMARY OF THE INVENTION

In one embodiment, a brake system, and particularly an overspeed brake system, for use with a rotating cable drum around which a cable operably coupled to an elevator car of an elevator is wound is provided. The brake system includes a brake rotor, a brake member, a brake member actuation lever, a biasing member, a speed sensing arrangement and a latch arrangement. The brake rotor is operably attachable to the cable drum to rotate with cable drum. The brake member selectively engages the brake rotor. The brake member actuation lever has a first position in which the brake rotor is free to move relative to the brake member and a second position in which the brake member is biased into engagement with the brake rotor and the brake rotor is prevented from moving relative to the brake member under the weight of the elevator car and any acceptable amount of cargo, i.e. the rated load of the elevator (i.e. the entire permissible loading on the system). The biasing member acts on the brake member actuation lever to bias the brake member actuation lever from the first position towards the second position. The speed sensing arrangement senses a rotational speed of the cable drum The latch arrangement has a first orientation maintaining the brake member actuation lever in the first position and a second orientation releasing the brake member actuation lever such that the brake member actuation lever can transition from the first position to the second position. The latch arrangement transitions from the first orientation to the second orientation when the speed sensing arrangement senses that the rotational speed of the cable drum is at least a predetermined rotational speed.

In one embodiment, the brake system is configured such that it can be retrofit attached to existing powerheads and particular to cable drums of existing powerheads.

In another embodiment, a powerhead including a brake system, a motor and a cable drum is provided.

In another embodiment, methods of operating a brake system for an elevator are provided. The method includes sensing a rotational speed of a cable drum of a powerhead of the elevator; and actuating a brake member to engage a rotor when the rotational speed of the cable drum is at least a predetermined rotational speed to engage a brake rotor operably attached to the cable drum. The brake rotor rotates with the cable drum, engagement of the brake member with the rotor reducing or stopping rotational motion of the rotor and cable drum.

In a further method, the method includes transitioning a brake member actuation lever from a first position in which the brake rotor is free to move relative to the brake member and a second position in which the brake member is biased into engagement with the brake rotor and the brake rotor is prevented from moving relative to the brake member under the weight of the elevator car and any rated load when the predetermined rotational speed is sensed.

In a further method, the method includes biasing the brake member actuation lever from the first position towards the second position; and transitioning a latch arrangement from a first orientation maintaining the brake member actuation lever in the first position to a second orientation releasing the brake member actuation lever such that the brake member actuation lever can transition from the first position to the second position. The latch arrangement transitions from the first orientation to the second orientation when the speed sensing arrangement senses that the rotational speed of the cable drum is at least a predetermined rotational speed.

In some embodiments and in some methods, battery backup is provided such that the braking device can be operated upon the loss of main power.

In some embodiments, upon the sensing of an overspeed event, operation of the elevator is prevented, such as by disconnecting power to the elevator to prevent operation thereof.

In some embodiments that include battery backup, the status of the backup battery is monitored and upon a determination that the backup battery has failed, operation of the elevator is prevented, such as by disconnecting power to the elevator to prevent operation thereof.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
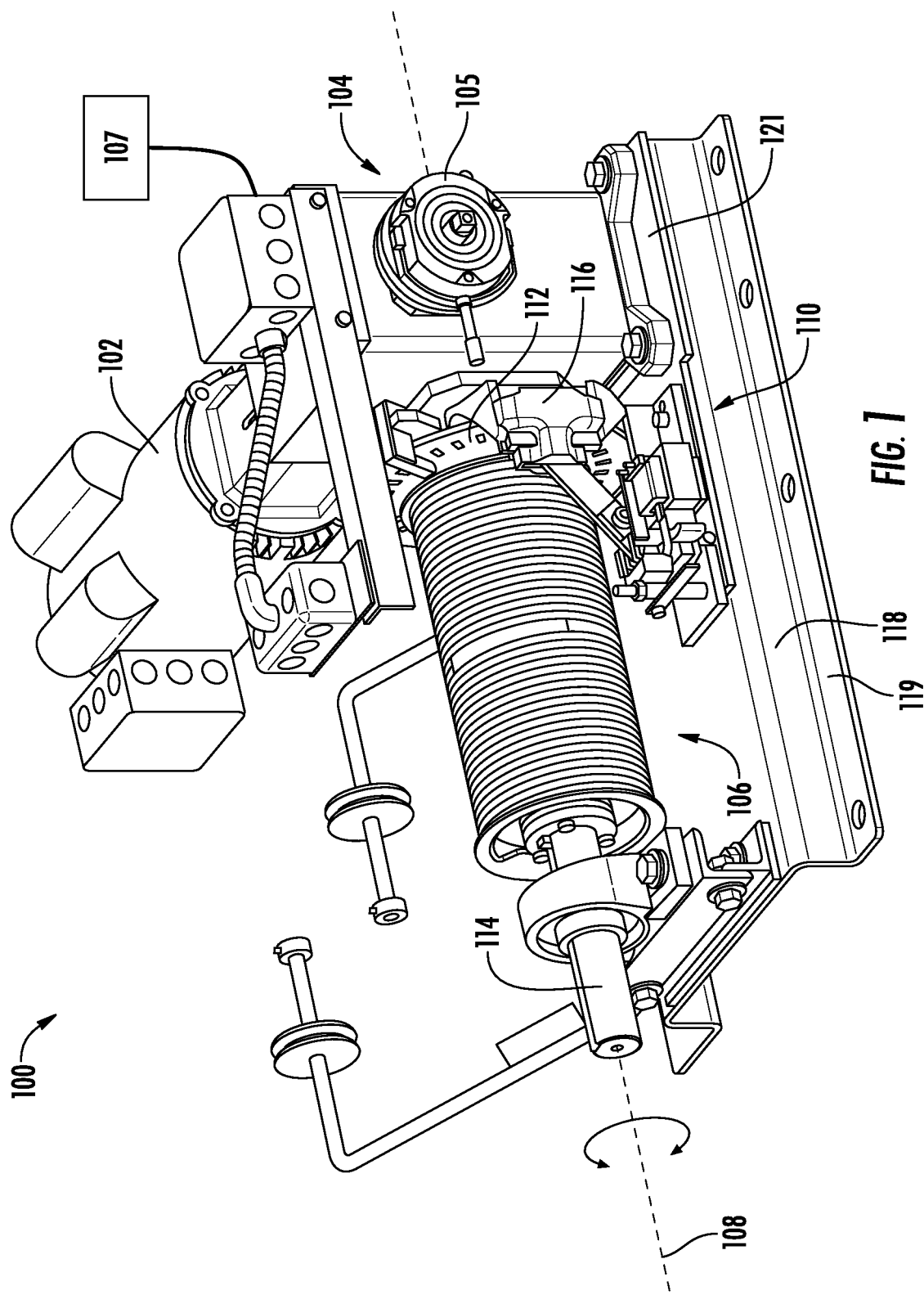
FIG. 1 is a perspective illustration of a powerhead for use with an elevator with a braking device.

FIG. 1 is a powerhead 100 for an elevator and more particularly for raising and lowering an elevator car. The powerhead 100 generally includes a motor 102, a gear box 104, a holding brake 105 and a cable drum 106 that is powered by the motor 102 through the gearbox 104. The drum 106 rotates about axis 108 to wind and unwind one or more cables (not shown) for raising and lowering the elevator car. Typically, two cables would be used. The cables would be wound or unwound depending on the direction of rotation of the drum 106 about axis 108 to raise and lower the elevator car and any included cargo.

The holding brake 105 is used when the powerhead 100 has raised or lowered the elevator car to a desired location. The holding brake 105 will actuate to hold the elevator car at the desired location such that power need not be maintained on the motor 102 to hold the elevator car. It is typically mounted to an external shaft extending outward from motor 102 or gearbox 104. It may be in the form of an armature actuated brake. The holding brake 105 will typically be open when the motor 102 is being powered to move the elevator car between desired positions. In some embodiments, holding brake 105 is an electrically actuated brake that controller 107 (shown schematically) will control when it is determined that the elevator car is in the desired location. The controller 107 may include or cooperate with a slack cable switch assembly. Controller 107 may be used to control motor 102 and other operational features of the elevator and powerhead 100.

An overspeed braking device 110 (generally referred to herein as "braking device 110) operably connected to the drum 106 provides a stopping device in the event that a rapid decent of the elevator car may be sensed. More particularly, the braking device 110 may be able to sense a potential failure in the drivetrain (e.g. motor 102 or gearbox 104) of the powerhead 100 and stop the drum 106 from rotating or limit rotation to prevent the elevator car from falling uncontrolled or at a rate greater than desired. The overspeed braking device 110 can be controlled by controller 107 or alternatively have a separate independent controller.

The braking device 110 includes a rotor 112 that is rotationally fixed to the drum 106 that rotates with the drum 106. The rotor 112 may be directly connected to the drum 106 or operably connected to other components in the drivetrain that rotate with the drum 106, such as shaft 114 which transfers rotational motion from gearbox 104 to drum 106.

The braking device 110 includes a brake caliper 116 (also referred to as a brake caliper assembly) that is operably mounted to base 118, which acts as a mechanical ground, and that can selectively engage and stop rotation of drum 106. The base 118 may be one or more components connected together. In this embodiment, the base 118 includes a main plate 119 and a shim plate 121 mounted to the main plate 119 for appropriately spacing the gear box 104 and rotor 112 from the main plate 119 for appropriate clearance. The shim plate 121 will often be used in retro-fit situations where the overspeed braking device 110 and particularly rotor 112 would contact main plate 119 when installed. Additional shim plates may be required to raise braking device 110 so that brake caliper 116 is aligned with the centerline of shaft 114. In this embodiment, the brake caliper 116 is attached to the main plate 119 through the shim plate 121. When the brake caliper 116 engages rotor 112, the rotor 112 will stop rotating and stop rotation of drum 106. While not directly illustrated, one or more brake members, such as brake pads, may be provided within the brake caliper 116 that can selectively engage opposed sides of the rotor 112 to engage and stop rotation of rotor 112.

Figure 2:
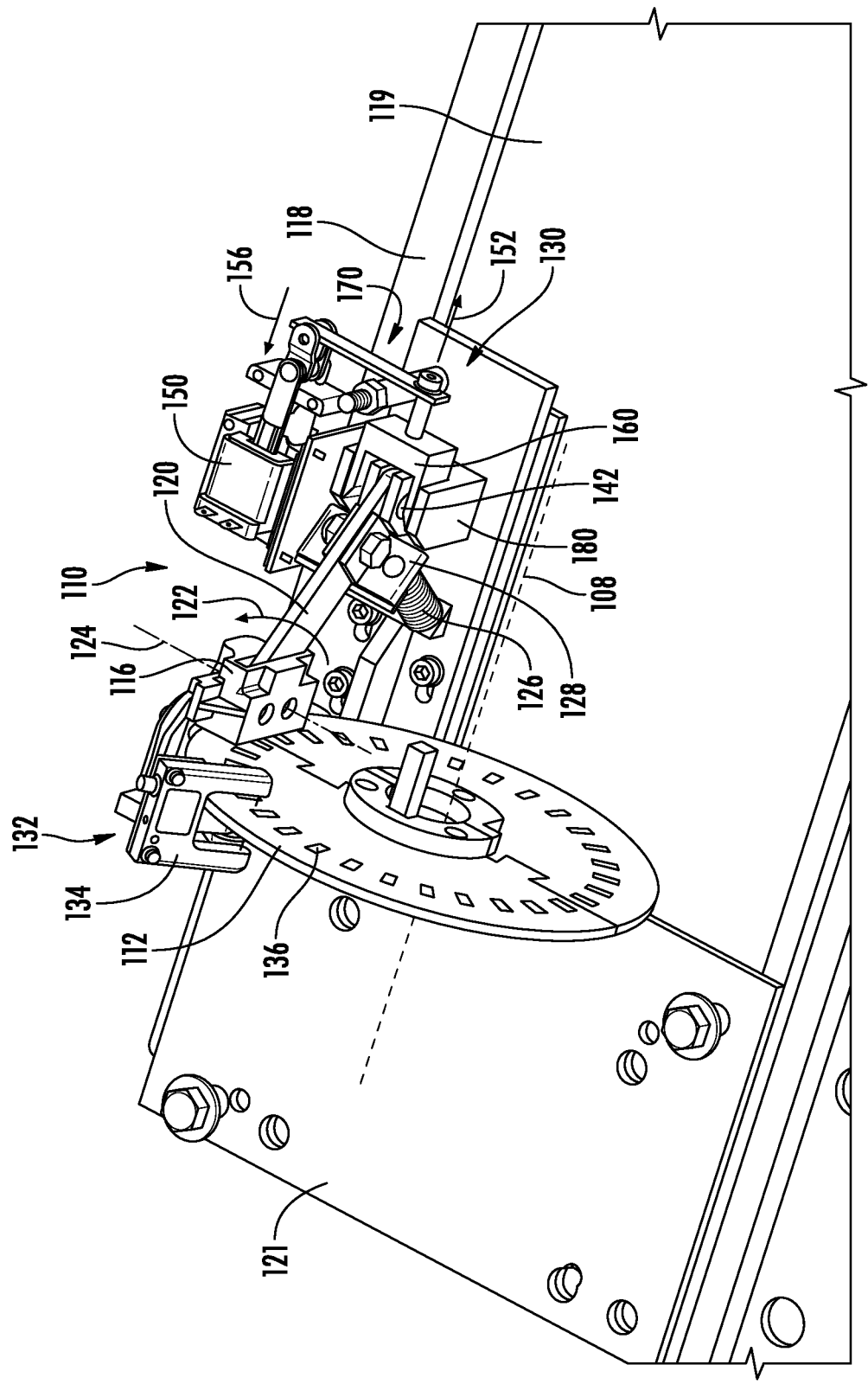
FIG. 2 is an enlarged partial perspective illustration of the powerhead of FIG. 1 illustrating the braking device for stopping rotation of the cable drum of the powerhead.
Figure 5:
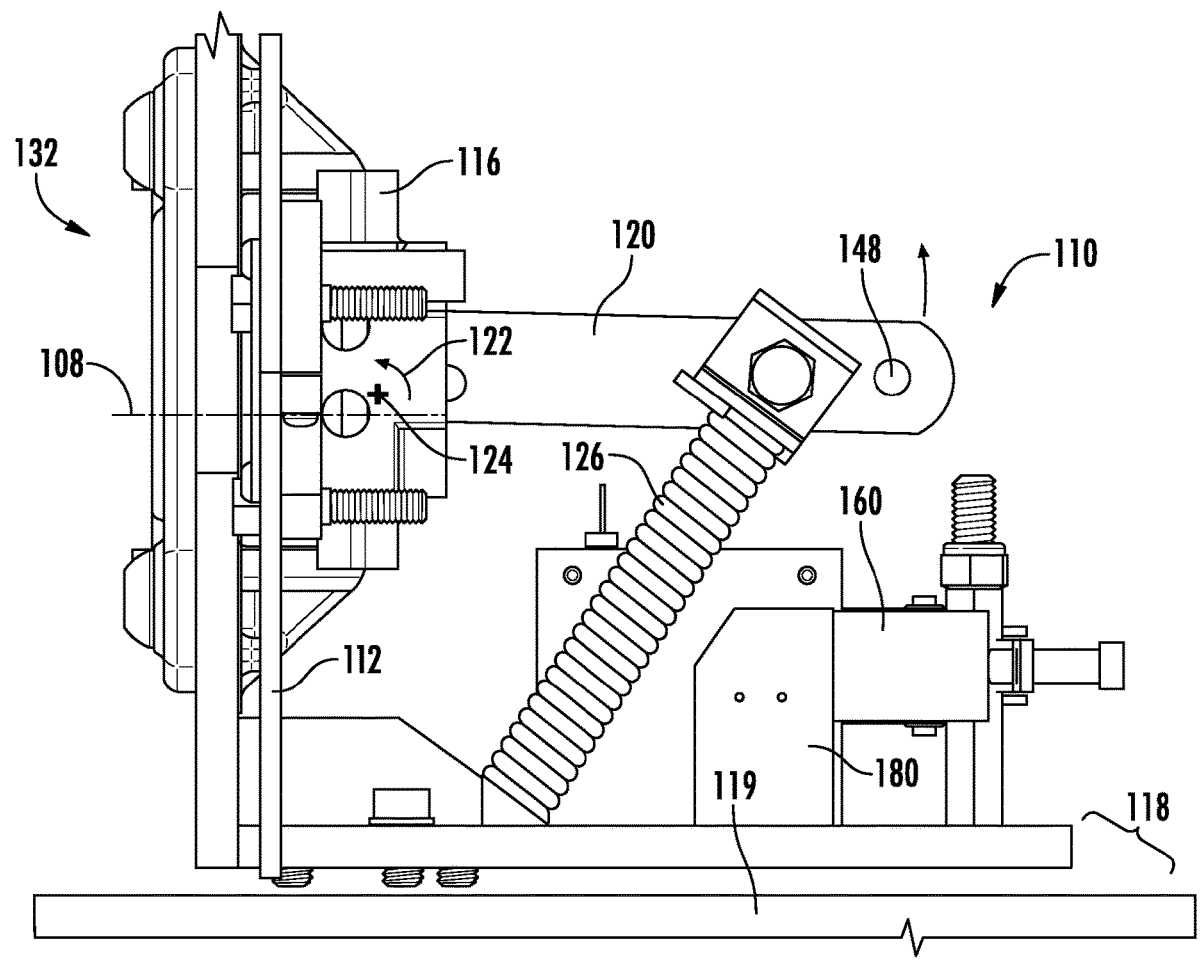
FIG. 5 is a profile illustration of the braking device of FIG. 2 in a second braking orientation with the brake member actuation lever in an exaggerated position for illustrative purposes.
Figure 6:
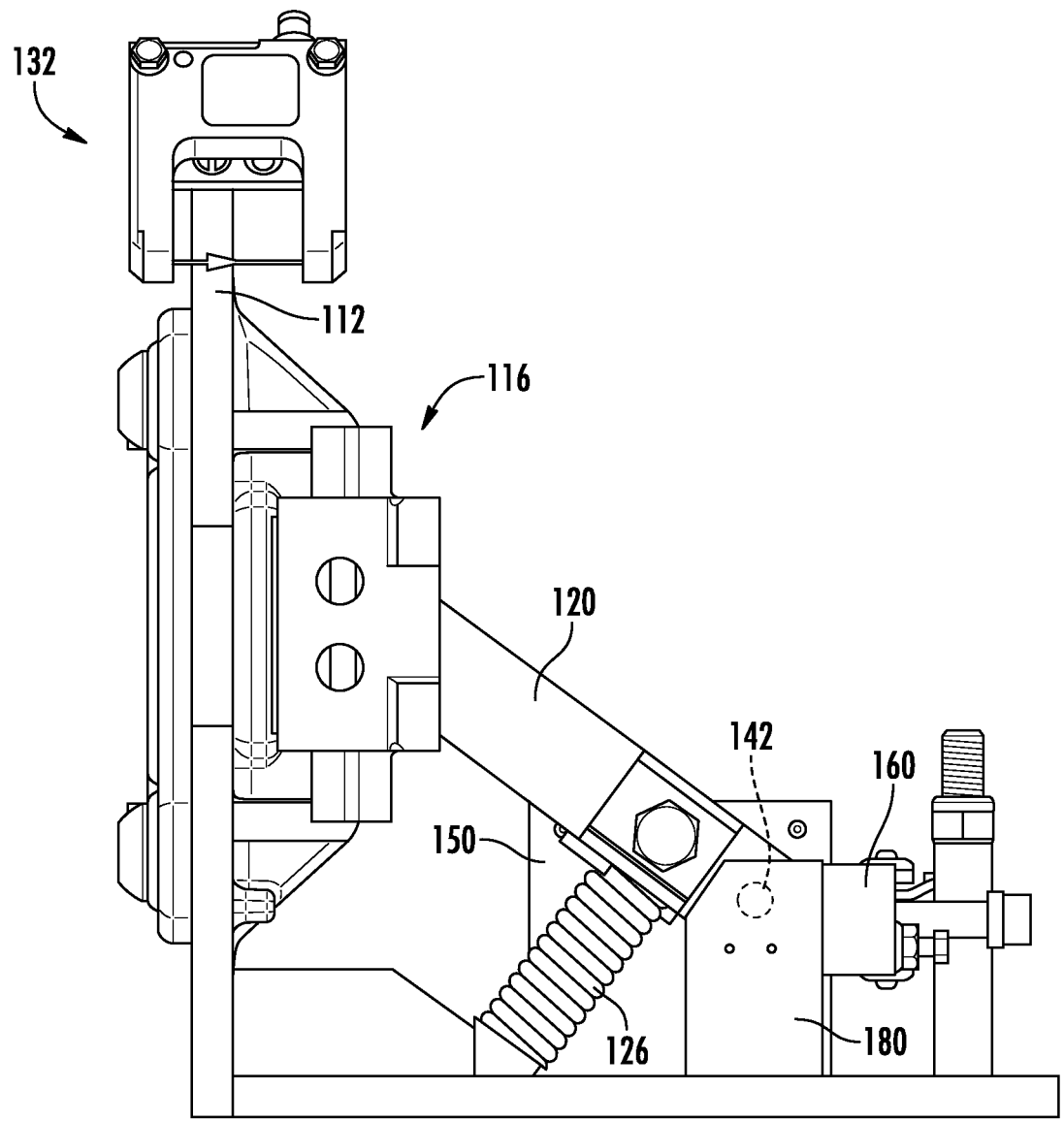
FIG. 6 is a profile illustration of the braking device in a first orientation.
Figure 7:
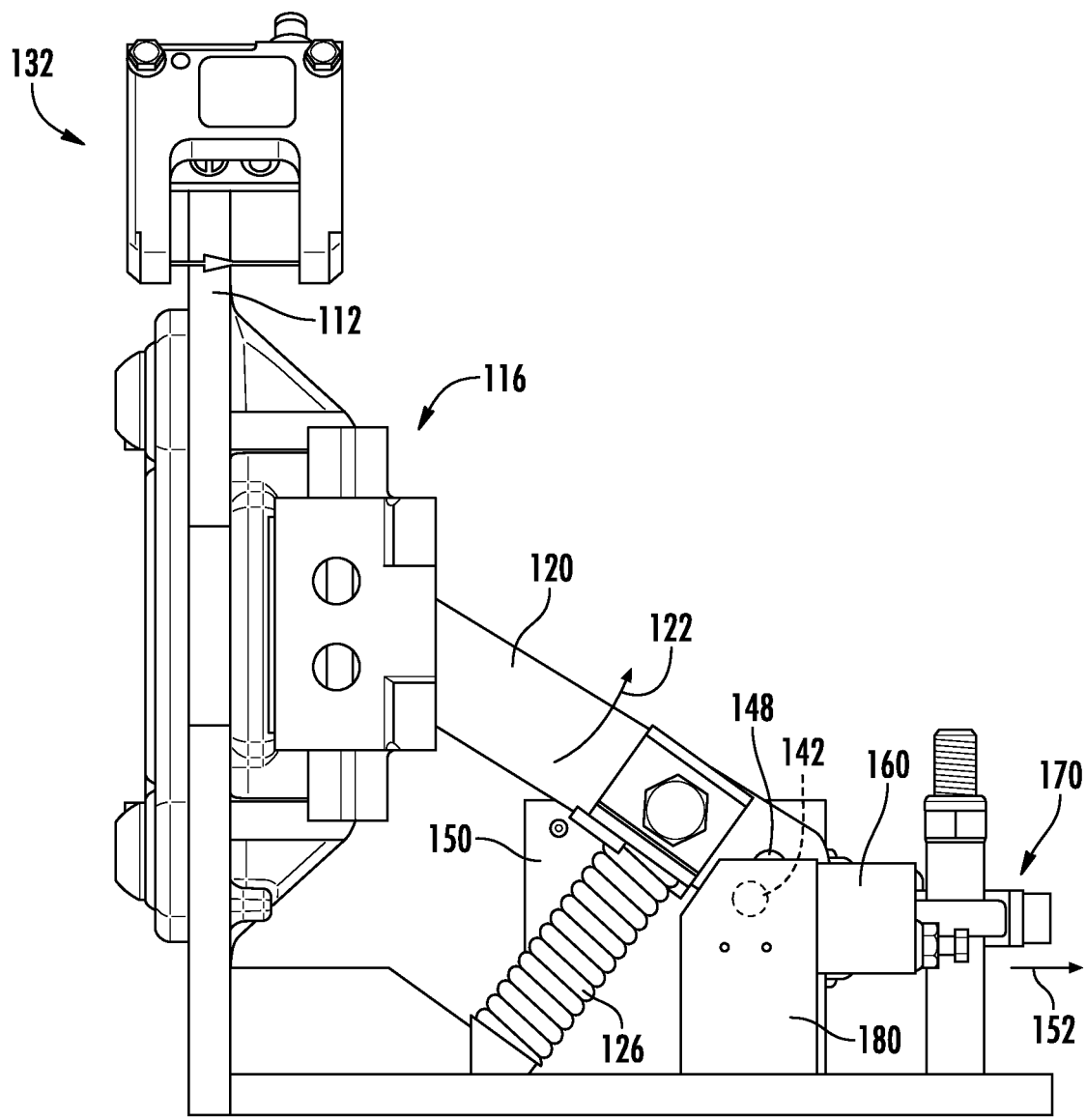
FIG. 7 is a profile illustration of the braking device in a second orientation.

With additional reference to FIG. 2, the braking device 110 includes a brake member actuation lever 120 that is used to selectively actuate the brake member(s). The brake member actuation lever 120 is generally transitionable from a first position, as illustrated in FIG. 1), to a second position illustrated by arrow 122 in FIG. 2 (see also the exaggerated position in FIG. 5 as well as the transition from FIG. 6 to FIG. 7). In the first position, the rotor 112 is free to move relative to the brake caliper 116 and the brake member. In the second position, the brake member is biased into engagement with the rotor 112 such that the rotor is prevented from rotating relative to base 118. In this second position, the engagement between the brake member and the rotor 112 prevents the drum 106 and, typically, shaft 114 from rotating about axis 108. More particularly, the engagement locks the rotor 112 to base 118 to prevent rotation of the rotor 112 under the weight of the elevator car plus cargo below or equal to the rated cargo capacity carried by the elevator car. The braking device 110 may not stop the car plus cargo if the cargo is above the rated weight of the elevator, but can provide controlled descent.

In the illustrated embodiment, the brake member actuation lever 120 rotates about axis 124 to transition from the first position to the second position. To rotate from the first position to the second position, one or more biasing members, illustrated in the form of coil springs 126 operably act on brake member actuation lever 120. In this embodiment, the coil springs 126 act between base 118 and a biasing plate 128 connected proximate a distal end of brake member actuation lever 120 spaced away from the end that is pivotally mounted for rotation about axis 124.

A latch arrangement 130 maintains the brake member actuation lever 120 in the first position until it is determined that the brake member needs to engage the rotor 112, e.g. upon an over speed condition (e.g. the drum 106/rotor 112 are rotating above a predetermined rotational speed threshold). In this embodiment, the latch arrangement 130 transitions from the first orientation in which the brake member actuation lever 120 is maintained in the first orientation to a second orientation that releases the brake member actuation lever 120 for actuation by the coil springs 126.

A speed sensing arrangement 132 operably senses rotational speed of the drum 106/rotor 112 to determine if the over speed condition has been reached. In the illustrated embodiment, an encoder 134 is provided that optically senses the rotational speed of the rotor 112. More particularly, the encoder 134 can sense marks on the rotor 112 in the form of notches 136 as they pass by encoder 134 to determine the rotational speed of rotor 112. If the rotational speed of rotor 112, which directly relates to the rotational speed of drum 106, meets or exceeds a predetermined threshold, a signal will be sent to the latch arrangement 130 to transition the latch arrangement from the first orientation to the second orientation. This transition will release the brake member actuation lever 120 to transition from its first position to its second position to operably actuate the brake member to engage rotor 112 and slow and/or completely stop rotation of drum 106 to ultimately stop movement of any controlled elevator car. While the encoder 134 directly senses motion of the rotor 112, other configurations are contemplated. However, by sensing the motion of the rotor 112, this allows for easy retrofit attachment of the various components to elevator powerheads 100 that do not include an overspeed braking system without requiring an entire rebuild of the powerhead 100.

Figure 3:
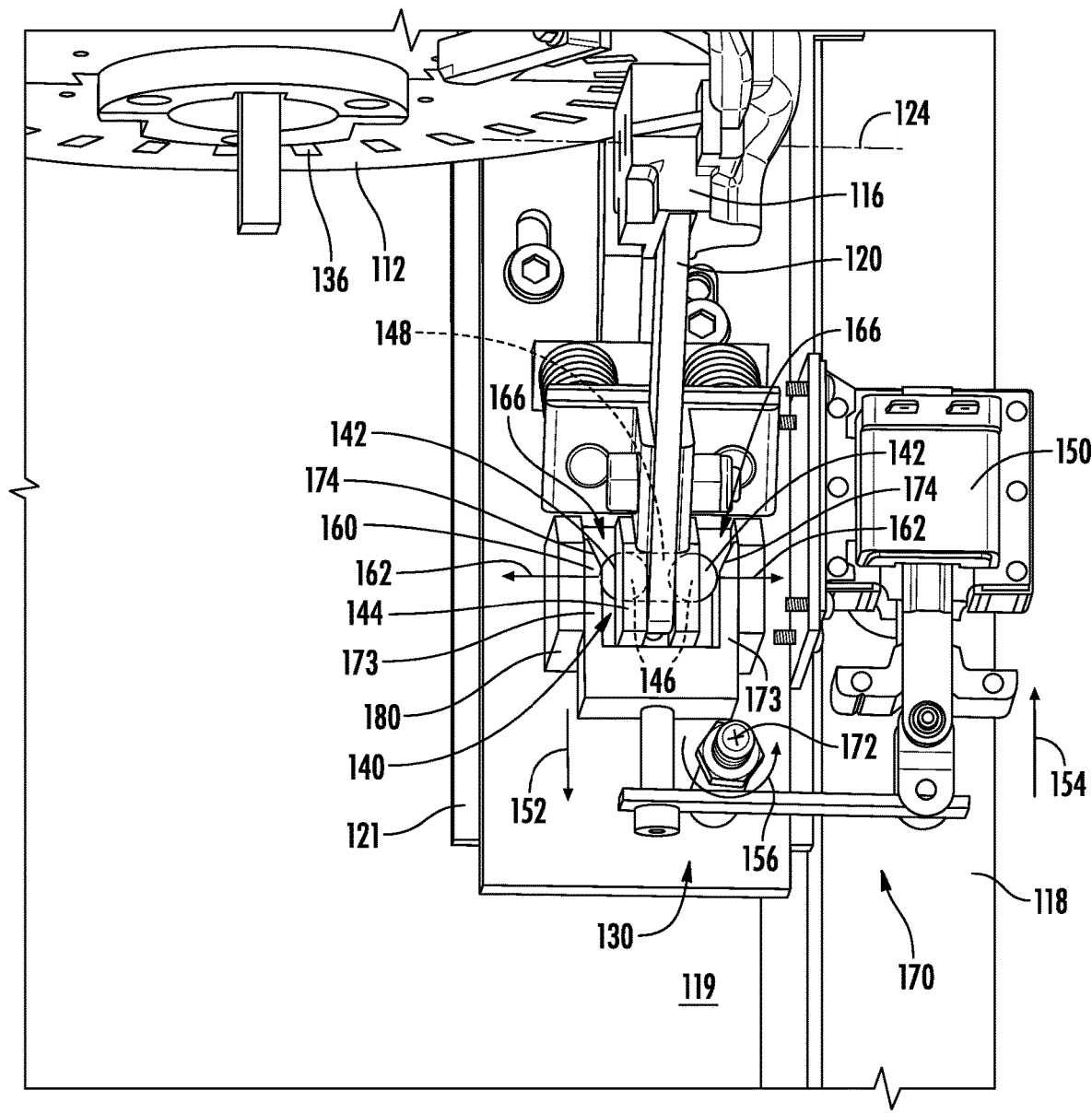
FIG. 3 is a top perspective illustration of the braking device of FIG. 2.

With additional reference to FIG. 3, the brake member actuation lever 120 and latch arrangement 130 have a releasable catch arrangement 140 therebetween. The catch arrangement 140 includes a pair of projection members 142 (although more or less projection members may be used) that are held in a projection member holder 144. In this embodiment, the projection members 142 are in the form of ball bearings. However other shapes are contemplated. The projection member holder 144 defines a pair of cavities 146 that hold the projection members 142. In this embodiment, the cavities 146 are not complete cylindrical bores but instead the portion in which the projection members 142 are held are shaped to match the shape of the projection members 142. As such, in this embodiment, the cavities 146 have a curved surface that properly mates with the curved outer surface of the projection members 142. The curved surface of the cavities 146 prevent the projection members 142 from passing entirely through the portion of the projection member holder 144 that defines the cavities 146. As such, cavities 146 in this embodiment do not allow the projection members 142 to pass entirely axially therethrough.

A second cavity 148 is provided by the brake member actuation lever 120 that is sized to receive, at least in part, the projection members 142 therein. In this embodiment, the projection members 142 engage the cavity 148 on opposed sides of the brake member actuation lever 120 in a sandwiched orientation.

When the latch arrangement 130 is in the first orientation, the projection members 142 extend into and are maintained within both of the cavities 146 of the projection member holder 144 and engage second cavity 148 of the brake member actuation lever 120. The projection members 142 thus extend across a gap formed between the projection member holder 144 and the brake member actuation lever 120. Thus, in this configuration, the projection members 142 prevent the brake member actuation lever 120 from moving relative to projection member holder 144, which is affixed to base 118.

When the latch arrangement 130 is in the second orientation, the projection members 142 are no longer maintained within the cavities 146 or 148 and no longer extend across the gap preventing movement of the brake member actuation lever 120. In this embodiment, the projection members 142 disengage cavity 148 but other arrangements are contemplated. This disengagement from the brake member actuation lever 120 allows the brake member actuation lever 120 to transition to the second position.

With reference to FIG. 3, an actuator 150 is operably coupled to the latch arrangement 130 to drive the latch arrangement from the first orientation (the orientation illustrated in FIG. 3) to the second orientation (illustrated by arrows 152, 154, 156) when the threshold rotational speed is sensed by sensing arrangement 132 (see FIG. 2 for the sensing arrangement 132).

Figure 4:
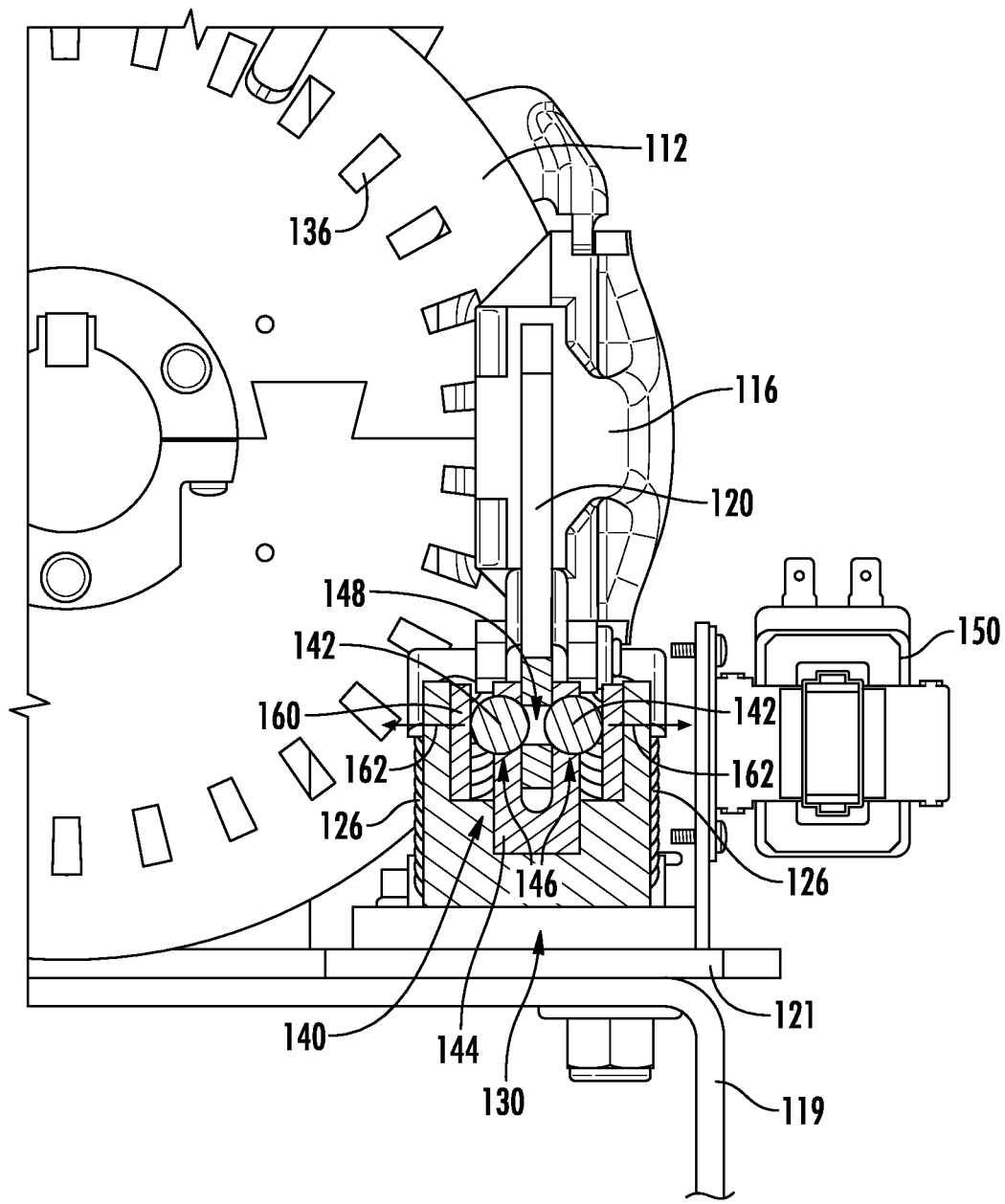
FIG. 4 is a cross-sectional illustration of the braking device of FIG. 2 illustrating the latch arrangement thereof.

To selectively maintain the projection members 142 in engagement with both the brake member actuation lever 120 and the projection member holder 144, a blocking member 160 is provided. The actuator 150 operably drives the blocking member 160 from a blocking position shown in FIG. 3 to an unblocking position represented by arrow 152. In the blocking position, the blocking member 160 maintains the projection members 142 in the first and second cavities 146, 148 by blocking movement of the projection members 142 (e.g. away from one another in FIG. 3). The blocking member 160 is movable relative to the projection member holder 144 to the unblocking position in which the projection members 142 are unblocked and the projection members 142 are no longer maintained in the second cavity 148. This removal is illustrated by arrows 162 in FIG. 4. However, in FIG. 4, the blocking member 160 hasn't moved pursuant to arrow 152 and is still blocking the projection members 142. As is illustrated in FIG. 3, a relief zone 166 is present in which the projection members 142 move radially outward.

In the illustrated embodiment, the projection members 142 and second cavity 148 have a cooperating interface that is configured such that when the blocking member 160 unblocks the projection members 142, the spring force provided by spring 126 acting on the brake member actuation lever 120 that biases the brake member actuation lever 120 from the first position towards the second position drives the projection members 142 out of the second cavity 148 of the lever 120 to release the brake member actuation lever 120 to be free to transition from the first position to the second position.

In some embodiments, the cooperating interface is provided by cooperating tapers provided by the projection members 142 and second cavity 148. In the illustrated embodiment, the cooperating interface is provided, at least in part, by the projection members being spherical ball bearings having curved surfaces that cooperate with edges that form second cavity 148 and that the ball bearings are greater in diameter than the second cavity 148. Thus, the ball bearings cannot move entirely into the second cavity 148 and the force of the lever 120 acting on the ball bearings has a component that is along/parallel to arrows 162.

In the illustrated embodiment, a pivoting linkage 170 is provided between and operably couple the blocking member 160 and the actuator 150 such that linear motion of the actuator along a first axis (illustrated by arrow 154) is converted into linear motion of the blocking member 160 along a second axis (illustrated by arrow 152). The pivoting linkage 170 pivots about axis 172 as illustrated by arrow 156 to allow for the appropriate driving of blocking member 160. Typically, the linear motion of the blocking member 160 will only be sufficient to allow the projection members 142 to transition out of the second cavity 148 sufficiently far to release the brake member actuation lever 120 but such that the projection members 142 remain secured by the projection member holder 144 (e.g. such that the ball bearings are not lost or ejected from the assembly).

In the illustrated embodiment, the blocking member 160 includes a pair of legs 173 that form a gap therebetween which receives the projection members 142, a portion of lever 120, and the projection member holder 144 when in the blocking position. Further, free ends of the legs have tapered surfaces 174 which help facilitate transitioning the blocking member 160 into the blocking position to set the latch arrangement 130 as well as to rapidly drive the blocking member 160 to the unblocking position. The spring force of spring 126 will act through the projection member members 142 and onto tapered surfaces 174 to rapidly drive the blocking member in the direction illustrated by arrow 152.

Additionally a blocking member guide 180 slidably carries the blocking member 160 and retains the projection members 142.

As such, the present system provides a fast acting overspeed braking system for stopping or slowing rotational motion of the cable drum 106. Due to the rapid actuation of the brake member, this system can be used for elevators that have smaller amounts of travel. For instance, this system can find particular use in residential elevators that may only have an amount of typically less than 50 feet of travel. Additionally, due to the compact design, this device is able to fit into the space available in the relatively small residential hoist ways where traditional speed governors will not fit as well as being able to detect over speed events and activate the device in a very short distance.

In one implementation, the holding brake 105 would typically be in an open position (e.g. no braking) when the overspeed braking system is actuated. This is because the overspeed braking system is typically actuated in non-typical situations (e.g. potential failure of a component in the drive train). Thus, the typical holding brake 105 is not an overspeed brake as disclosed herein. It is a benefit of the illustrated embodiment that the overspeed braking system acts directly on the shaft that carries the cable drum 106 or directly on the cable drum 106 itself as it reduces the number of components between the overspeed braking system 110 and the cable drum 106. As such, it reduces or eliminates any components that can fail therebetween resulting in uncontrolled descent of the elevator car. This arrangement is unlike the holding brake 105 which will typically have gears between the cable drum 106 and holding brake 105 that provide components that can potentially fail therebetween.

In some implementations, the powerhead 100 and particularly the overspeed braking system 110 includes a battery backup system such that the overspeed braking system 110 can be activated and controlled in the event of a power failure.

Figure 8:
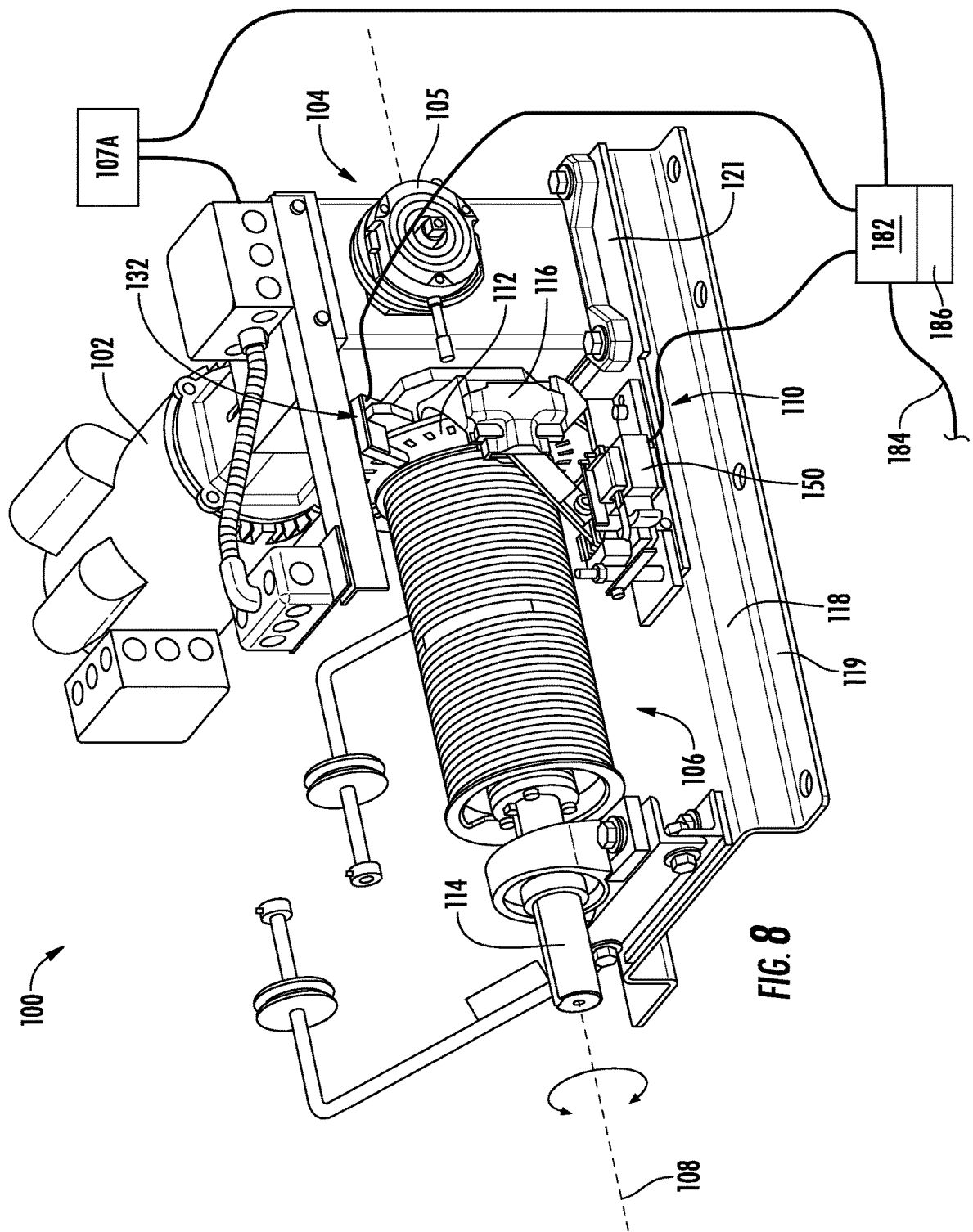
FIG. 8 is a simplified perspective illustration similar to FIG. 1 including an overspeed controller configured to control the braking device in the event of a main power failure.

FIG. 8 is a slightly modified version of FIG. 1 incorporating a battery backup system. In this embodiment, a standalone overspeed controller 182 is provided. This allows for retrofitting the overspeed braking system 110 into existing installations without requiring reconfiguring the controls of the elevator. Further, overspeed controller 182 would be operably connected to sensing arrangement 132 to be able to actuate actuator 150.

In this embodiment main power 184, which would have otherwise been directed to the elevator controller (e.g. controller 107) is directed into the standalone overspeed controller 182. During normal operation, the power from main power 184 is passed through the overspeed controller 182 to controller 107A to power the powerhead 100 and elevator as normal. In this arrangement, if an overspeed event is sensed, the overspeed controller 182 will energize the actuator 150 to engage the overspeed braking system 110. In a preferred implementation, the controller 182 will also disconnect power to the original elevator controller 107A.

The overspeed controller 182 includes a battery backup 186 in the form of an uninterruptible power supply (UPS) in the event of loss of main power 184. When power is lost, the overspeed controller 182 will be able to function as normal and have the ability to energize actuator 150 by the power supplied by the UPS until the battery charge is depleted.

The overspeed controller 182 may also be configured such that if the UPS were to fail, the overspeed controller 182 will disconnect power to the elevator controller 107A to prevent the elevator from functioning until the UPS is repaired.

While FIG. 8 illustrates overspeed controller 182 and controller 107A as separate components, e.g. making a system that allows for retrofitting existing elevator and powerhead systems with the overspeed braking system 110, these two controllers 107A and 182 could be combined into a single controller that also includes the battery backup. This would be useful, for example, when doing a new elevator installation. Such a combined controller could have the same functionality of preventing operation of the elevator, e.g. by disconnecting power being supplied to motor 102 when an overspeed event is detected as well as operating the overspeed braking system 110. Further yet, the single controller could be used to sense the operational state of the UPS to allow for inhibiting operation of the elevator in the event that the UPS is not operational.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A brake system for use with a rotating cable drum around which a cable operably coupled to an elevator car of an elevator is wound, comprising:

a brake rotor operably attachable to the cable drum to rotate with cable drum;

a brake caliper assembly including:
  a brake member for selectively engaging with the brake rotor;
  a brake member actuation lever having a first position in which the brake rotor is free to move relative to the brake member and a second position in which the brake member is biased into engagement with the brake rotor and the brake rotor is prevented from moving relative to the brake member under the weight of the elevator car and any rated load;
  a biasing member acting on the brake member actuation lever biasing the brake member actuation lever from the first position towards the second position;

a speed sensing arrangement for sensing a rotational speed of the cable drum;

a latch arrangement having a first orientation maintaining the brake member actuation lever in the first position and a second orientation releasing the brake member actuation lever such that the brake member actuation lever can transition from the first position to the second position, the latch arrangement transitioning from the first orientation to the second orientation when the speed sensing arrangement senses that the rotational speed of the cable drum is at least a predetermined rotational speed; and wherein:
  the brake member actuation lever and latch arrangement includes a catch arrangement therebetween, the catch arrangement including:
    a projection member;
    a projection member holder including a first cavity holding the projection member; and
    a second cavity provided by the brake member actuation lever sized to receive the projection member therein;
  in the first orientation, the projection member extends into the first and second cavities inhibiting motion of the brake member actuation lever from the first position to the second position;
  in the second orientation, the projection member is removed from the second cavity and the brake member actuation lever is permitted to transition from the first position to the second position.

2. The brake system of claim 1, wherein an actuator is coupled to the latch arrangement to drive the latch arrangement from the first orientation to the second orientation when the predetermined rotational speed is sensed.

3. The brake system of claim 2, wherein the speed sensing arrangement includes an encoder arrangement including a plurality of marks formed on the brake rotor and a sensor for sensing motion of the marks on the brake rotor to determine the rotational speed of the cable drum.

4. The brake system of claim 2, wherein the catch arrangement includes a blocking member having a blocking position in which the blocking member maintains the projection member in the first and second cavities in the first orientation and that is moveable relative to the projection member holder to an unblocking position in which the projection member is unblocked and the projection member is allowed to be removed from the second cavity in the second orientation.

5. The brake system of claim 4, wherein the projection member and second cavity have a cooperating interface that is configured such that when the blocking member unblocks the projection member the spring force provided by the biasing member acting on the brake member actuation lever biasing the brake member actuation lever from the first position towards the second position drives the projection member out of the second cavity to release the brake member actuation lever to transition from the first position to the second position.

6. The brake system of claim 5, wherein the cooperating interface is provided by cooperating tapers provided by the projection member and second cavity.

7. The brake system of claim 5, wherein the cooperating interface is provided, at least in part, by the projection member having a curved surface.

8. The brake system of claim 5, wherein the cooperating interface is provided, at least in part, by the projection member being spherical.

9. The brake system of claim 4, wherein the blocking member is driven from the blocking position to the unblocking position by the actuator.

10. The brake system of claim 9, further comprising a pivoting linkage between the blocking member and the actuator such that linear motion of the actuator along a first axis is converted into linear motion of the blocking member along a second axis.

11. The brake system of claim 2, further comprising an overspeed controller connected to the actuator and configured to control actuation of the actuator, the overspeed controller including a backup battery for powering the actuator in the event of a main power failure.

12. The brake system of claim 11, wherein the overspeed controller is a standalone controller configured to be interposed between a main controller of a powerhead of an elevator and to selectively supply power to the main controller, the overspeed controller configured to prevent supplying power to the main controller when an overspeed event is sensed.

13. A brake system for use with a rotating cable drum around which a cable operably coupled to an elevator car of an elevator is wound, comprising:
  a brake rotor operably attachable to the cable drum to rotate with cable drum;
  a brake caliper assembly including:
    a brake member for selectively engaging with the brake rotor;
    a brake member actuation lever having a first position in which the brake rotor is free to move relative to the brake member and a second position in which the brake member is biased into engagement with the brake rotor and the brake rotor is prevented from moving relative to the brake member under the weight of the elevator car and any rated load;
    a biasing member acting on the brake member actuation lever biasing the brake member actuation lever from the first position towards the second position;
  a speed sensing arrangement for sensing a rotational speed of the cable drum;
  a latch arrangement having a first orientation maintaining the brake member actuation lever in the first position and a second orientation releasing the brake member actuation lever such that the brake member actuation lever can transition from the first position to the second position, the latch arrangement transitioning from the first orientation to the second orientation when the speed sensing arrangement senses that the rotational speed of the cable drum is at least a predetermined rotational speed;

an actuator coupled to the latch arrangement to drive the latch arrangement from the first orientation to the second orientation when the predetermined rotational speed is sensed; and a controller connected to the actuator and configured to control actuation of the actuator and to activate the actuator when the predetermined rotational speed is sensed, the overspeed controller including a backup battery for powering the actuator in the event of a main power failure.

14. The brake system of claim 13, wherein the controller is part of a controller configured to control other operations of the elevator.

15. The brake system of claim 13, wherein if the controller senses a failure in the battery backup, the controller prevents operation of the elevator.

16. A powerhead for an elevator comprising:
a motor;
a cable drum operably driven by the motor;
a brake system comprising:
  a brake rotor operably attachable to the cable drum to rotate with cable drum;
  a brake caliper assembly including:
    a brake member for selectively engaging with the brake rotor;
    a brake member actuation lever having a first position in which the brake rotor is free to move relative to the brake member and a second position in which the brake member is biased into engagement with the brake rotor and the brake rotor is prevented from moving relative to the brake member under the weight of the elevator car and any rated load;
  a biasing member acting on the brake member actuation lever biasing the brake member actuation lever from the first position towards the second position;
  a speed sensing arrangement for sensing a rotational speed of the cable drum;
  a latch arrangement having a first orientation maintaining the brake member actuation lever in the first position and a second orientation releasing the brake member actuation lever such that the brake member actuation lever can transition from the first position to the second position, the latch arrangement transitioning from the first orientation to the second orientation when the speed sensing arrangement senses that the rotational speed of the cable drum is at least a predetermined rotational speed;
the brake system being operably attached to the cable drum such that when the brake member actuation lever is in the first position the brake rotor is free to move relative to the brake member and when the brake member actuation lever is in the second position the brake member is biased into engagement with the brake rotor and the brake rotor is prevented from moving relative to the brake member inhibiting rotational motion of the cable drum;
an actuator coupled to the latch arrangement to drive the latch arrangement from the first orientation to the second orientation when the predetermined rotational speed is sensed; and
an overspeed controller connected to the actuator and configured to control actuation of the actuator, the overspeed controller including a backup battery for powering the actuator in the event of a main power failure.

17. A powerhead for an elevator comprising:
a motor;
a cable drum operably driven by the motor;
a brake system comprising:
  a brake rotor operably attachable to the cable drum to rotate with cable drum;
  a brake caliper assembly including:
    a brake member for selectively engaging with the brake rotor;
    a brake member actuation lever having a first position in which the brake rotor is free to move relative to the brake member and a second position in which the brake member is biased into engagement with the brake rotor and the brake rotor is prevented from moving relative to the brake member under the weight of the elevator car and any rated load;
  a biasing member acting on the brake member actuation lever biasing the brake member actuation lever from the first position towards the second position;
  a speed sensing arrangement for sensing a rotational speed of the cable drum;
  a latch arrangement having a first orientation maintaining the brake member actuation lever in the first position and a second orientation releasing the brake member actuation lever such that the brake member actuation lever can transition from the first position to the second position, the latch arrangement transitioning from the first orientation to the second orientation when the speed sensing arrangement senses that the rotational speed of the cable drum is at least a predetermined rotational speed;
the brake system being operably attached to the cable drum such that when the brake member actuation lever is in the first position the brake rotor is free to move relative to the brake member and when the brake member actuation lever is in the second position the brake member is biased into engagement with the brake rotor and the brake rotor is prevented from moving relative to the brake member inhibiting rotational motion of the cable drum;
an actuator coupled to the latch arrangement to drive the latch arrangement from the first orientation to the second orientation when the predetermined rotational speed is sensed; and
a controller connected to the actuator and configured to control actuation of the actuator, the controller including a backup battery for powering the actuator in the event of a main power failure, the controller being configured to control the motor that drives the cable drum.

18. The powerhead of claim 17, wherein the controller prevents actuation of the motor upon sensing a loss of main power, the controller activating the actuator upon the loss of main power.

19. The powerhead of claim 17, wherein if the controller senses a failure in the backup battery, the controller prevents operation of the elevator.

20. A method of operating a brake system for an elevator comprising:
sensing a rotational speed of a cable drum of a powerhead of the elevator;
actuating a brake member to engage a rotor when the rotational speed of the cable drum is at least a predetermined rotational speed to engage a brake rotor operably attached to the cable drum, the brake rotor rotating with the cable drum, engagement of the brake member with the rotor reducing or stopping rotational motion of the rotor and cable drum;

transitioning a brake member actuation lever from a first position in which the brake rotor is free to move relative to the brake member and a second position in which the brake member is biased into engagement with the brake rotor and the brake rotor is prevented from moving relative to the brake member under the weight of the elevator car and any rated load when the predetermined rotational speed is sensed;

biasing the brake member actuation lever from the first position towards the second position;

transitioning a latch arrangement from a first orientation maintaining the brake member actuation lever in the first position to a second orientation releasing the brake member actuation lever such that the brake member actuation lever can transition from the first position to the second position, the latch arrangement transitioning from the first orientation to the second orientation when the speed sensing arrangement senses that the rotational speed of the cable drum is at least a predetermined rotational speed;

wherein transitioning the latch arrangement includes actuating an electrically powered actuator, wherein actuating an electrically powered actuator occurs upon a failure of main power and the electrically powered actuator is powered by a backup battery.

21. The method of claim 20, further comprising:

monitoring the operational state of the battery backup; and preventing operation of the elevator when the operational state of the battery backup has failed.

\* \* \* \* \*